United States Patent [19]

Turner

[11] 4,346,300
[45] Aug. 24, 1982

[54] FILM SHEET CASSETTE

[75] Inventor: George F. A. M. Turner, Ingatestone, England

[73] Assignee: Ciba-Geigy AG, Basel, Switzerland

[21] Appl. No.: 135,024

[22] Filed: Mar. 28, 1980

[30] Foreign Application Priority Data

Apr. 20, 1979 [GB] United Kingdom ............. 7913880

[51] Int. Cl.³ .................... G03D 13/08; G03D 13/10
[52] U.S. Cl. ................................... 206/455; 378/187
[58] Field of Search ............... 250/275, 280, 281, 282; 354/276

[56] References Cited

U.S. PATENT DOCUMENTS

| | | | |
|---|---|---|---|
| 2,590,891 | 4/1952 | Reuter | 250/480 |
| 3,704,369 | 11/1972 | Paidosh | 250/480 |
| 4,013,890 | 3/1977 | Conrad | 250/480 |
| 4,264,821 | 4/1981 | Bauer | 250/481 |

FOREIGN PATENT DOCUMENTS 667325 2/1952 United Kingdom .

Primary Examiner—Bruce C. Anderson
Attorney, Agent, or Firm—Harry Falber

[57] ABSTRACT

A film sheet cassette is described which comprises a frame to which is attached a flat fixed front plate and a flat fixed back plate and located between them a movable pressure plate which is held in operative position when the cassette is closed by the force of magnetic repulsion exerted between an array of permanent magnetic poles of alternating polarity which is integral with the pressure plate and a second array of permanent magnets attached to a parallel top plate supported in the frame of the cassette. The cassette is opened by sliding the top plate so that the magnets of each array then attract each other.

12 Claims, 8 Drawing Figures

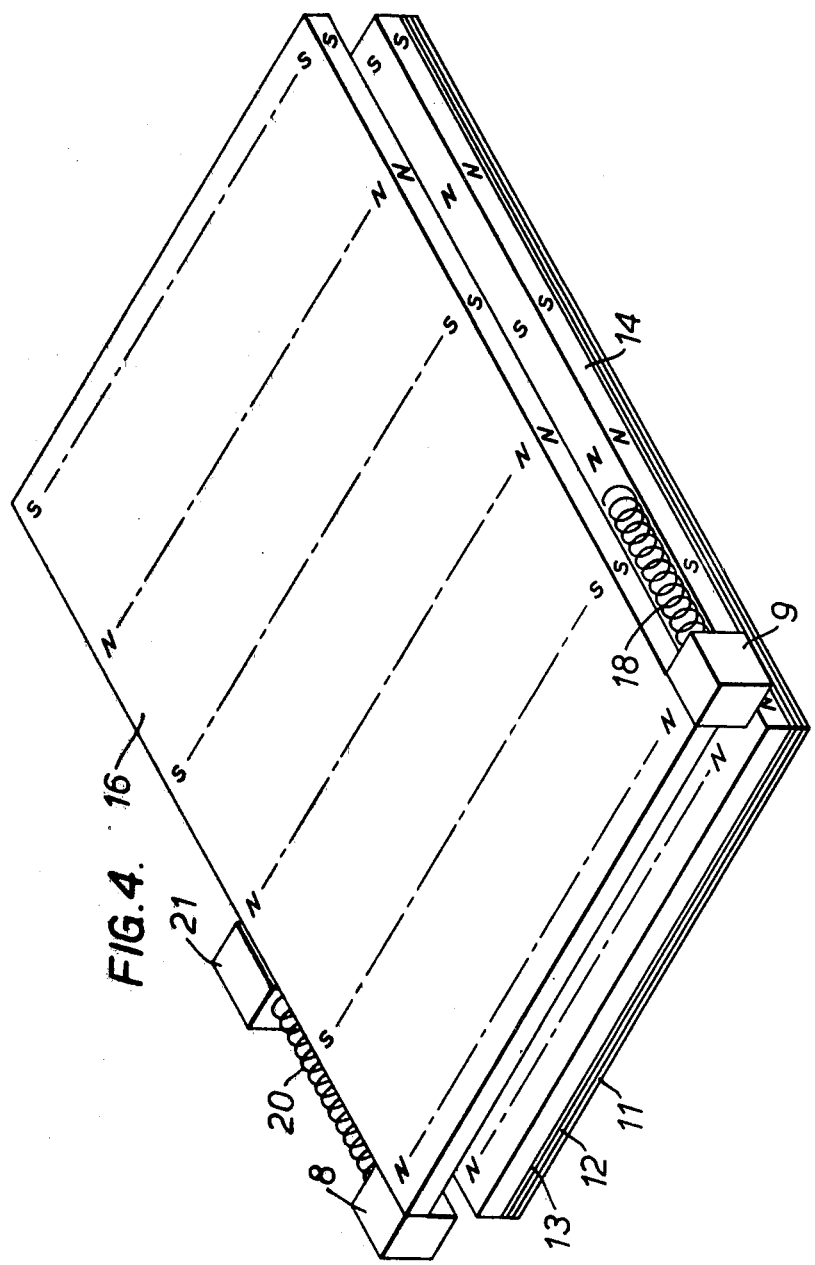

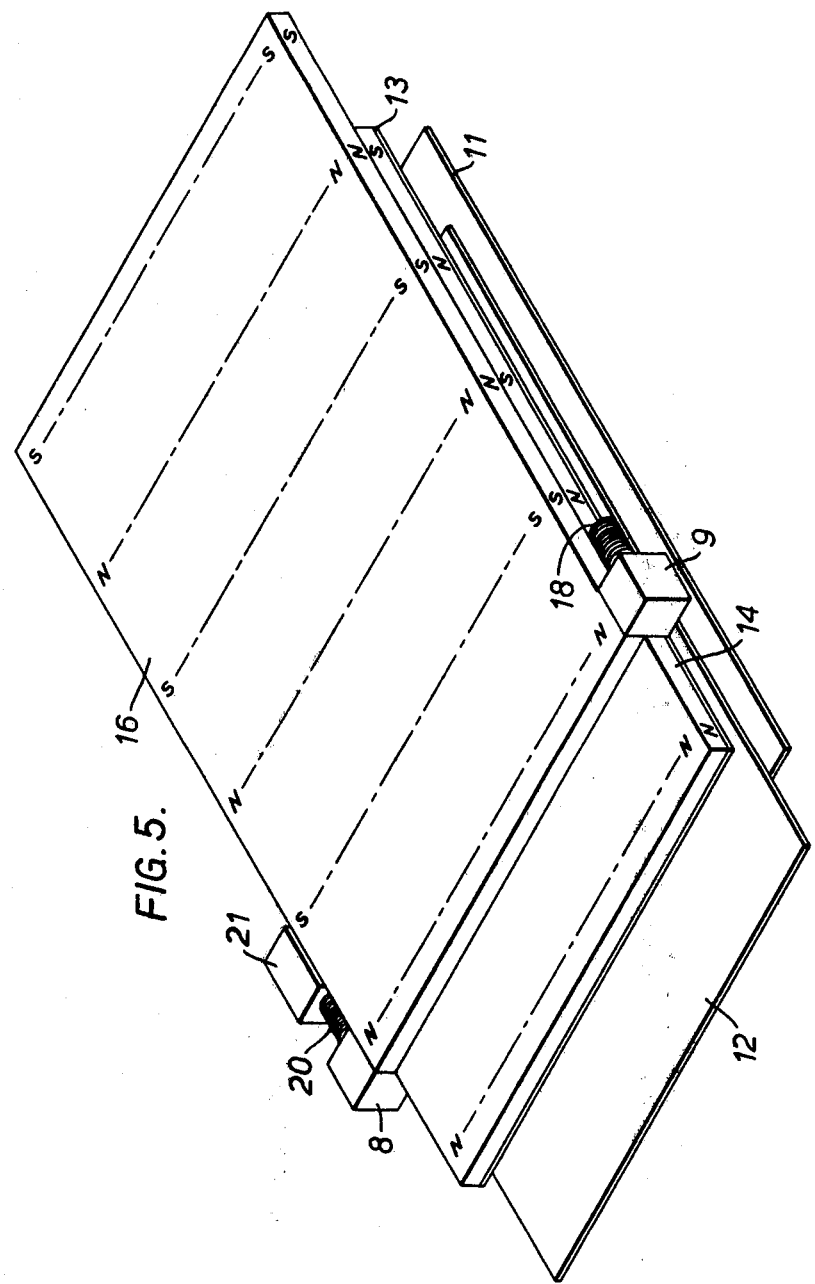

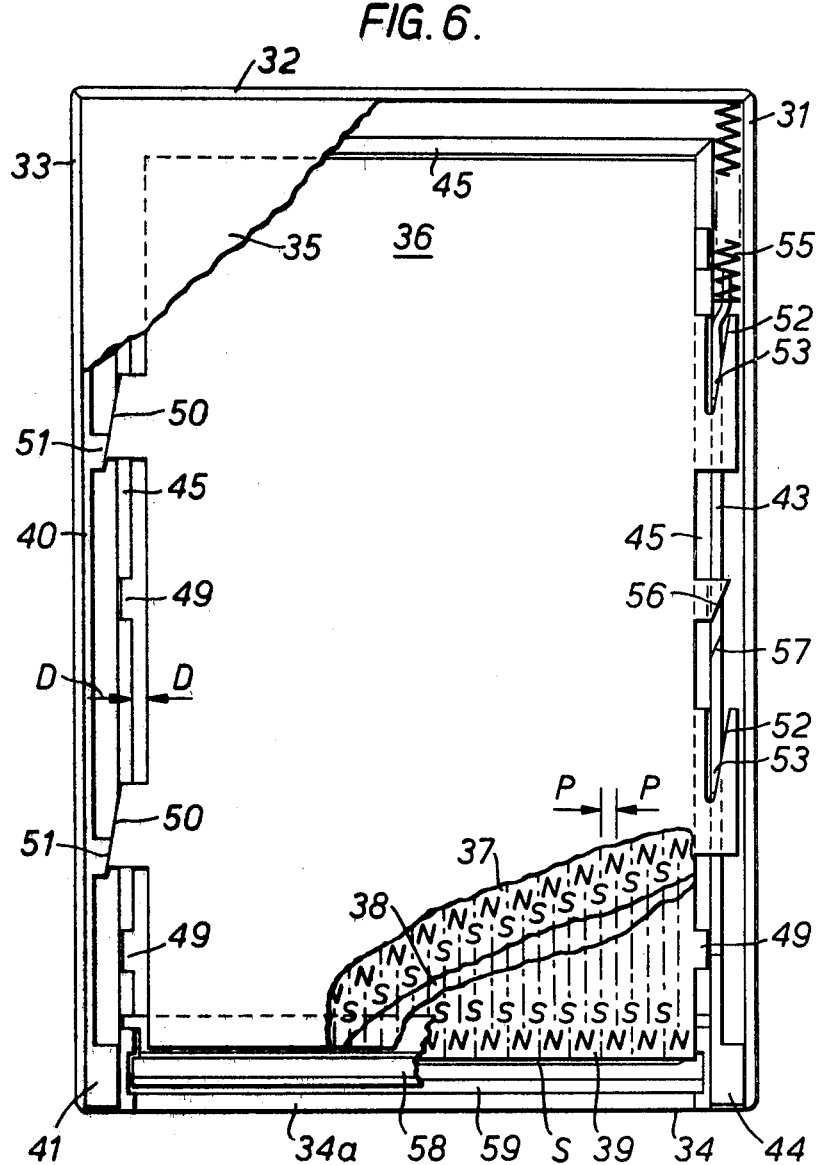

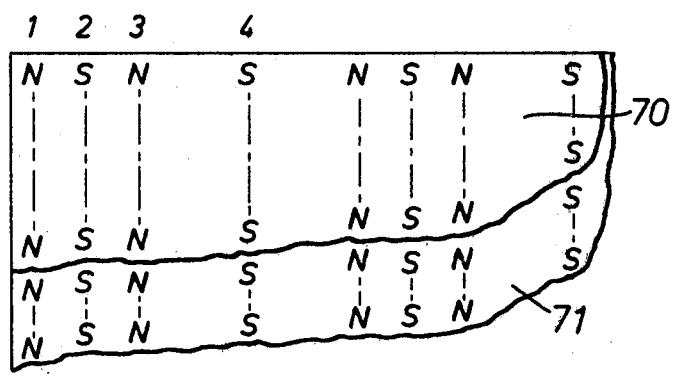
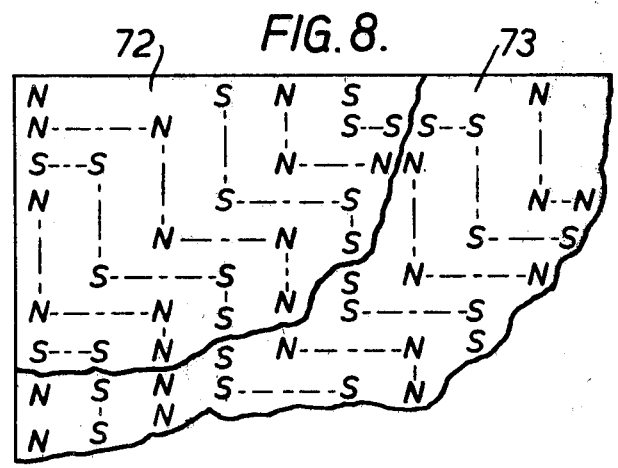

FILM SHEET CASSETTE

THIS INVENTION relates to a film sheet cassette and in particular to an X-ray film cassette.

X-ray films when they are exposed are usually sandwiched between two X-ray intensifying screens in a flat film cassette. Normally such cassettes are loaded with film and unloaded in the dark manually. However recently schemes have been introduced whereby such cassettes are loaded in a bulk film loader and unloaded in a film processing apparatus, both these operations taking place in daylight conditions without the necessity of locating either the bulk loader or the processor in a dark-room.

Some cassettes suitable for loading and unloading in daylight conditions consist of a frame to which is attached a substantially flat fixed front plate and a substantially flat fixed back plate and located therebetween a movable pressure plate for resiliently bearing towards the said back plate when the cassette is in the closed position. The cassette also has at one end of the frame a slot for loading or unloading the cassette and a light shielding means which prevents ingress of light between the pressure plate and the back plate when the cassette is closed. Usually one intensifying screen is secured to the inside face of the back plate and the other intensifying screen is secured to the face of the pressure plate which faces the inside face of the back plate. In operation the X-ray film is sandwiched between the two screens, the pressure plate being biased towards the back plate. When the cassette is opened the pressure plate is lifted away from the back plate and this leaves sufficient room for the X-ray film to drop out of the cassette from between the two screens. Such a cassette is described in British Patent Specification No. 1,361,012 and another such cassette is described in United States Patent Specification No. 3,930,165.

X-ray film cassettes which comprise a frame to which is attached a substantially flat fixed front plate and a substantially flat fixed back plate and located therebetween a movable pressure plate for resiliently bearing towards the back plate when the cassette is in the closed state but which is raised from the back plate when the cassette is in the open state and which has at one end of the frame a slot for loading or unloading the cassette and a light shielding means which, when the cassette is in the closed state, prevents the ingress of light between the pressure plate and the back plate are hereinafter referred to as fixed plate cassettes of the type hereinbefore defined.

One of the troubles associated with fixed plate cassettes of the type hereinbefore defined is that it is difficult to provide an efficient pressure plate actuating mechanism in the small space available, the dimensions of the cassette being laid down by international standards and the maximum thickness of all the cassettes being 1.5 cm. The various pressure plate actuating means suggested tend to be mechanically unreliable and subject to mechanical failure. Also because of the low tolerances required both in the machining of the mechanical parts and in the assembly of the cassette the cassettes tend to be rather expensive.

We have discovered a method of actuating the pressure plate in fixed plate cassettes of the type hereinbefore described which relies only partly and then indirectly on mechanical means.

Therefore according to the present invention there is provided a fixed plate cassette of the type hereinbefore defined in which the pressure plate is held in operative position when the cassette is in the closed state by the force of magnetic repulsion exerted between a first array of permanent magnetic poles of alternating polarity which is integral with or is attached to said pressure plate and a second co-acting array of permanent magnets attached to a parallel top plate supported in the frame of the cassette, the pressure plate being retractable from the operative position by causing said parallel top plate to slide to a position in which the magnetic poles in said first array of magnetic poles attract the dissimilar poles of the said second array, thereby moving the said pressure plate towards the said parallel top plate, so opening the cassette.

Preferably the parallel top plate is caused to slide by acting on two push rods which are coupled to the parallel top plate and which are located one at each of opposite sides of the frame for linear movement between a first position which corresponds to the cassette closed state and a second position which corresponds to the cassette open state.

In one embodiment of the film sheet cassette of the present invention each push rod is connected to the top plate and the top plate slides together with the push rods when they are moved linearly, moving in its own plane.

In another embodiment of the film sheet cassette of the present invention each push rod is coupled to the top plate by pressure applying means and when the push rods are actuated the top plate slides across the cassette at right angles to the linear path of the rods.

Preferably the pressure applying means are a series of of engaging wedges located on the push rods and on the top plate.

Preferably thin plastics material having a low friction surface is present between the two arrays of magnets. A suitable plastics material to use is a sheet of polytetrafluoroethylene. The presence of the plastics material between the two arrays of magnets does not reduce to any appreciable extent the repulsion forces exerted on each other by the two arrays of magnets but it serves to limit the force of attraction and to reduce the friction between the two arrays when the cassette is in the open state. This enables the top plate to be moved more easily when the push rods are actuated.

The array of magnets on the top plate may be a series of individual magnets or it may be a sheet of material which contains integrally an array of magnets. Similarly if a separate pressure plate is used this may have individual magnets mounted on it or it may have a sheet of material having an integral array of magnets mounted on it. Most preferably the two arrays of magnets are of the same type.

Particularly suitable sheet material which contains integrally an array of magnets is the material known as magnetic rubber which is marketed by James Niell & Co., Sheffield.

In one useful form the sheet material has across its width a series of north poles, then removed by one pitch a series of south poles across its width, this continuing up the whole length of the sheet. However the magnetic pattern may be of any type as long as it is possible to arrange for the two arrays of magnets alternatively to to present like or unlike poles to each other in the two states of the cassette, i.e. open and closed state.

In another useful form two sheets of material having integral magnets are used, the poles being so arranged that maximum repulsive force is achieved but not maximum attractive force. This is sometimes desirable because magnetic attraction draws the magnetic sheets together and the reduced separation leads to a force of magnetic attraction which tends to be stronger than of magnetic repulsion.

The individual magnets of use in the cassette of the present invention are required to be thin and preferably are not more than 1.75 mm thick. Particularly suitable magnets are the flat bar type of magnet marketed by James Niell & Co. under the name of "Eclipse".

Preferably the magnets are secured to both the pressure plate and the top plate by means of an adhesive. Suitable adhesives are the epoxy resins and double sided adhesive tapes.

In use preferably an X-ray intensifying screen is mounted on the inside of the back plate and an X-ray intensifying screen is mounted on the underside of the pressure plate, i.e. the side which is urged towards the back plate in the cassette closed state.

Thus the cassette of the present invention comprises a flat frame member having fixed front and back plates and a slot at one end of the frame for inserting or removing the film. This slot is closed by a light shielding means when the cassette is in the closed state but the shielding means is removed from the slot when the cassette is in the open state. Whether the cassette is in the open or closed state is determined by the position of the pressure plate which is located in the cassette between the fixed front and back plates. When the pressure plate is urged against the back plate it will hold securely any film which is present on the back plate or on the intensifying screen on the back plate if present.

When the pressure plate is raised from the back plate any film present therebetween can easily be removed by gravity when the cassette is held so that the slot faces downwards. Similarly the cassette can easily be loaded in the cassette open position either by gravity or by feeding the film into the cassette by means of rollers or like means.

Preferably the cassette is opened and closed by pressing two push rods. Preferably these rods are spring loaded so causing the cassette to remain in the closed state unless the rods are pressed against the spring means.

Similar means employing two arrays of magnets can also be used to open and close the light shielding means.

Various X-ray film cassettes of the hinged type are known in which the film is caused to come into close contact with the intensifying screens by means of magnetic attraction. Examples of such cassettes are those described in German patent specifications 2802730, 1112887 and 949980, and also in U.S. Pat. Nos. 2,694,153, 2,590,891 and 2,590,892, and also in British patent specification No. 667,325. The hinged cassettes described in these patent specifications are entirely different from the fixed plate cassette of the present invention which can be used for daylight loading and unloading. Moreover the magnetic attraction plays no part in opening or closing the cassette.

U.S. Pat. No. 3,704,369 discloses a further X-ray film cassette construction. This cassette relies upon the attracting or repelling forces of magnetic sheets to place the X-ray film and intensifying screens in intimate contact. It is to be noted, however, that this construction is not a fixed plate cassette as defined hereinbefore.

Moreover, it does not allow for the loading or unloading of the film in daylight conditions or for use with automated loading and unloading apparatus. Rather, individual manual opening and removal of the film is required under darkened conditions. Further the magnetic attraction or repulsion plays no part in the opening or closing of the cassette.

The accompanying drawings will serve to illustrate the invention.

FIGS. 4 and 5 are a top plan part sectional view of the inside features of the cassette of FIGS. 2 and 3.

FIG. 6 is a top plan part sectional view of the inside features of a film cassette according to the present invention wherein the push rods are coupled with the top plate by wedge means and the top plate slides across the cassette transversely.

FIGS. 7 and 8 serve to indicate ways of reducing maximum attraction between two magnetic sheets.

In all the FIGS. 1–5 the same numbers have the same signification.

Figure 1:
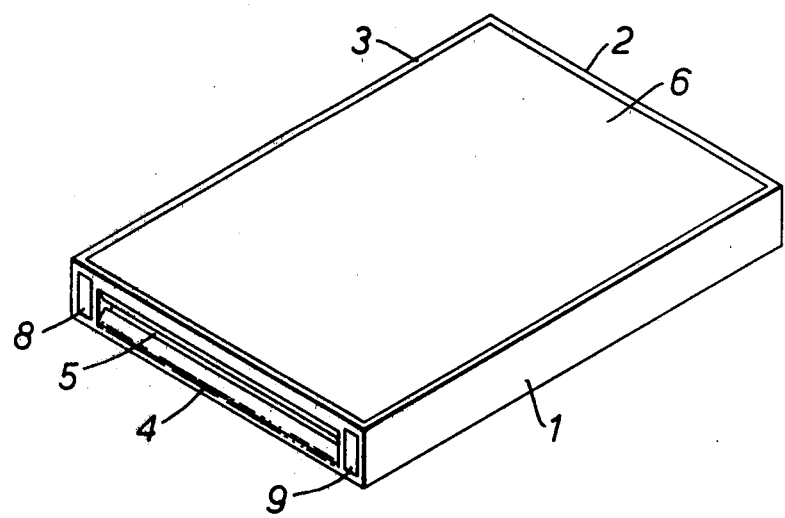
FIG. 1 is an isometric view of a cassette according to the present invention showing the external features.

In FIG. 1 the cassette comprises side walls 1, 3 and end walls 2, 4. In end 4 is a slot 5 which is used to load or empty the cassette with an X-ray film. The cassette also has a fixed front plate 6 (and a similar fixed back plate 7 which is not shown in FIG. 1). Shown on either side of the slot 5 are the ends of short push rods 8 and 9.

Figure 2:
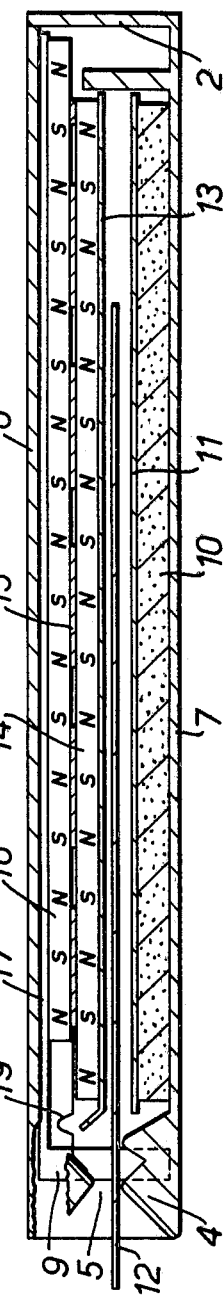
FIG. 2 is a cross-section side elevation of a film cassette according to the present invention, with the cassette in the open state, the top plate being connected to the push rod and moving linearly therewith.
Figure 3:
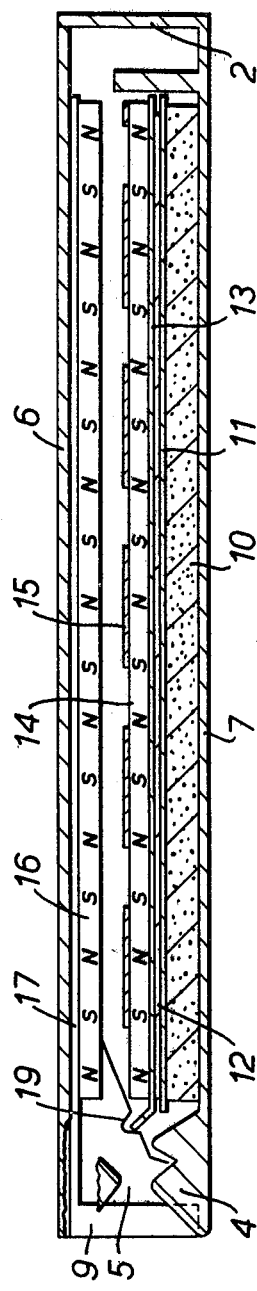
FIG. 3 is the same cross-sectional view as FIG. 2 with the cassette in the closed state.

In FIGS. 2 and 3 the fixed front plate 6 and fixed back plate 7 are shown as well as the end wall 2 and end wall 4 and the slot 5 in end wall 4.

Present, in order, in the cassette are a strip of foam material 10 which is secured to the inside of the back plate 7 and an X-ray intensifying screen 11. Above the screen 11 is an X-ray film 12 and above this a further X-ray intensifying screen 13. Then a pressure plate 14 which is a sheet of material which contains an integral array of magnets. The arrangement of the poles of the magnets is indicated. Above the sheet material 14 is a polyfluoroethylene sheet 15. Above the sheet 15 is a sheet of material bearing integrally an array of magnets 16 which is mounted on the underside of a support plate 17. The arrangement of the poles of the magnets 16 is shown. The support plate 17 is mounted on to a short push rod 9 (which is shown in FIG. 4). At the end of the push rod 9 is a spring 18 (also shown in FIG. 4). A light shielding device 19 is shown attached to the sheet 16.

FIG. 3 shows exactly the same features as shown in FIG. 2 but the pressure plate 14 is biased towards the back plate 7 sandwiching the film 12 firmly between the two screens 11 and 13.

It is to be noted that in FIG. 2 poles of unlike sign in the two arrays of magnets are opposite each other whilst in FIG. 3 poles of like sign are opposite each other in the two arrays of magnets.

FIGS. 4 and 5 show the essential features of the inside of the cassette, i.e. with the frame removed. Also the support plate which is attached to the short push rods 8 and 9 has been left out.

The other spring 20 which bears against push rod 8 is also shown in this view, as is an abutment member 21 mounted on the frame. A similar abutment member is present (but not shown) adjacent to spring 18 on the other side of the cassette.

When the push rods 8 and 9 are depressed the springs 18 and 20 are depressed against their adjacent abutment members.

FIGS. 4 and 5 serve in particular to show the parallel rows of magnetic poles across both sheets of material 14 and 16. They also show how in the cassette open state the rows of north poles are opposite the rows of south poles so raising up sheet 14 towards sheet 16. While in the cassette closed state rows of north poles are opposite rows of north poles so forcing the sheets 14 and 16 apart.

The cassette is normally stored as shown in FIG. 3, with or without an X-ray film present. But it is normal practice in hospitals to keep X-ray cassettes fully loaded. However to load the cassette, a cassette as shown in FIG. 3 is inserted in a cassette loading device, for example the device of Brit. Pat. No. 1,361,014 or of German OLS No. 2,812,368.

When the cassette is placed in such a loading device its end becomes light-sealed and abutment members in the loading device press against the ends of the push rods 8 and 9. This causes the top plate to be pushed down against the springs 18 and 20 and moves the array of magnets 16 relative to the array of magnets 14 so that unlike poles are now opposite each other. The resultant attraction force between the two arrays of magnets raises the pressure plate 14 towards the support plate 17, thus opening the cassette. The cassette is then in the open state as shown in FIG. 2. An X-ray film is then dropped or fed into the cassette by the loading device. The cassette is then removed from the loading device, thus releasing the pressure on the push rods 8 and 9. The cassette is then in the closed state as shown in FIG. 3.

In FIG. 6 the cassette comprises four frame members 31, 32, 33 and 34. In member 34 is the film entry loading and unloading slot 34a. The front plate 35 is shown mostly cut away. Underneath the front plate 35 is shown the top plate 36. Attached to the underside of the top plate 36 is a magnetic rubber sheet 37 which has across its width an array of magnets as shown. The displacement between each north pole and each south pole (the pole pitch) is indicated by P-P. Underneath the magnetic rubber sheet 37 is a polytetrafluoroethylene sheet 38 and underneath this sheet is the pressure plate 39 which is also a magnetic sheet.

Underneath the pressure plate 39 there is attached an intensifying screen S. Underneath the screen S (but not shown) is an X-ray film, another intensifying screen and the back plate of the cassette.

It is to be observed that the poles of the magnetic sheets 37 and 39 are aligned along the length of the sheets whilst in the cassette of FIGS. 2–5 the poles on the magnetic sheets were aligned across the width of the sheets. On one side of the cassette is a push rod 40 having a push button 41. On the other side of the cassette is a push rod 43 having a push button 44.

The pressure plate 39 is partially enclosed by channel walls 45, the members of which are parallel to the frame members 31–33. Present on the pressure plate 39 are locating tabs 49 which fit into the channel walls 45.

Present in the top plate 36 along the edge which faces the push rod 40 are two wedges 50. The wedges 50 are shown in contact with smaller wedges 51 present on the push rod 40.

Present on the top plate 36 along the edge which faces the push rod 43 are two wedges 52. The wedges 52 are shown in contact with raised members 53 on the push rod 43. In contact with each push rod 40 and 43 is a spring but only the spring 55 coupled to the push rod 43 is shown.

Also present on the top plate 36 along the edge which faces the push rod 43 is another wedge 56. Shown close to but not in contact therewith is another wedge 57 which is present on the push rod 43.

Also shown is a light shield 58 which fits into a groove 59 located in the slot 34a.

The cassette in FIG. 6 is shown in the closed position, the magnetic poles in the two sheets 37 and 39 being in register. This means that the repulsion forces between the two magnetic sheets causes sheet 39 to press very firmly on the screen S. In this closed position the top plate 36 abuts the right hand wall of the channel walls 45. It is separated from the left hand channel wall by the dimension D-D which is the same distance as the pole pitch P-P.

In order to open the cassette both the push buttons 41 and 44 of the push rods 40 and 43 are pushed. This alters the relative position of the wedge members 50 and 51. It disengages members 53 from wedges 52 but engages wedge 57 into operative contact with wedge 56.

These actions combine to cause the top plate 36 to slide laterally across the cassette until its left hand side abuts the left hand side of the channel wall 45. This change in position of the top plate causes the north poles on sheet 37 now to be in register with the south poles on sheet 39. This attraction force causes sheet 39 to be raised. At the same time as top plate 36 is sliding laterally in the cassette a spring member (not shown) causes the light shielding member 58 to be lifted out of the groove 59 thus opening the slot 34a. This allows the X-ray film which was sandwiched between the screens to fall out of the cassette.

The pressure on the buttons 41 and 44 is then released and the spring coupled to rod 40 causes wedges 51 to act on wedges 50 forcing the top plate to slide across the cassette. At the same time the members 55 on rod 43 engage the wedges 52 and wedges 56 and 57 are no longer in operative contact. This returns the top plate to the closed position shown in FIG. 6. At the same time light shield 58 is caused to seat in the groove 59.

In the cassette of the present invention it is to be understood that the frame may be integral with the front or back plate.

Various ways may be employed for reducing the attractive force between two arrays of magnets. For example the rows of magnetic poles may be unevenly spaced or arranged in another manner so that all the like poles are in register when the cassette is in the closed state but not all the unlike poles are in register when the cassette is in the open state.

One such method is shown in FIG. 7 wherein two sheets of magnetic rubber 70 and 71 have the rows of magnetic poles aligned as shown. In FIG. 7 like poles are in register so the two sheets are in a state of repulsion. When the top sheet 70 is moved laterally one pole pitch to the right unlike poles are then in register except that the north poles of row 3 have no corresponding array of south poles and the south poles of row 4 have no corresponding array of north poles.

FIG. 8 shows a more complex arrangement of magnetic poles on sheets 72 and 73. Like poles are in register in the position shown in FIG. 8 but when sheet 72 is moved with respect to sheet 73 the majority of the poles in register are unlike poles but some like poles are also in register. This reduces the attractive force between the two sheets.

Other ways of reducing the attractive force between two sheets of magnetic material include shifting one sheet relative to the other sheet but less or more than one pole pitch so that unlike poles are not quite in register.

I claim:

1. A fixed plate cassette comprising a frame with fixed front and back plates, a pressure plate positioned between said front and back plates, a parallel top plate supported in said frame, means connected to said frame for moving said top plate, a first array of permanent magnetic poles of alternating polarity and a second array of permanent magnets, in which the pressure plate is held in operative position when the cassette is in the closed state by the force of magnetic repulsion exerted between said first array of permanent magnetic poles of alternating polarity which is integral with or is attached to said pressure plate and said second coacting array of permanent magnets attached to said parallel top plate, the pressure plate being retractable from the operative position by activating said moving means causing said parallel top plate to slide to a position in which the magnetic poles in said first array of magnetic poles attract the dissimilar poles of said second array, thereby moving said pressure plate towards said parallel top plate, so opening the cassette.

2. A fixed plate cassette according to claim 1 wherein the means for moving said parallel top plate comprises two push rods which are coupled to the parallel top plate and which are located one at each of opposite sides of the frame for linear movement between a first position which corresponds to the cassette closed state and a second position which corresponds to the cassette open state.

3. A fixed plate cassette according to either claim 1 or claim 2 wherein thin plastics material having a low friction surface is present between the two arrays of magnets.

4. A fixed plate cassette according to claim 3 wherein the plastics material is a sheet of polytetrafluoroethylene.

5. A fixed plate cassette according to claim 1 wherein both arrays of magnets comprise individual magnets.

6. A fixed plate cassette according to claim 1 wherein both arrays of magnets consist of sheet material which contains integrally an array of magnets.

7. A fixed plate cassette according to claim 6 wherein the pressure plate consists of sheet material which contains integrally an array of magnets.

8. A fixed plate cassette according to either claim 6 or claim 7 wherein the sheet material which contains integrally an array of magnets is the material known as magnetic rubber.

9. A fixed plate cassette according to any one of claims 6 wherein the poles of the magnets in the two sheets of material are so arranged that maximum repulsive force is achieved but not maximum attractive force.

10. A fixed plate cassette according to claim 2 wherein each push rod is connected to the top plate and the top plate slides together with the push rods when they are moved linearly.

11. A fixed plate cassette according to claim 2 wherein each push rod is coupled to the top plate by pressure applying means and when the push rods are actuated the top plate slides across the cassette at right angles to the linear path of the rods, moving in its own plane.

12. A fixed plate cassette according to claim 11 wherein the pressure applying means are a series of engaging wedges located on the push rods and on the top plate.

* * * * *